United States Patent
Ide

(10) Patent No.: US 7,381,898 B2
(45) Date of Patent: Jun. 3, 2008

(54) ELECTRICAL CONNECTION STRUCTURE

(75) Inventor: Takehisa Ide, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/681,714

(22) Filed: Mar. 2, 2007

(65) Prior Publication Data

US 2007/0205015 A1    Sep. 6, 2007

(30) Foreign Application Priority Data

Mar. 3, 2006  (JP) ............................ 2006-057750
Jun. 9, 2006  (JP) ............................ 2006-160601
Dec. 13, 2006 (JP) ............................ 2006-336100

(51) Int. Cl.
*H02G 1/00* (2006.01)

(52) U.S. Cl. ............ 174/72 A; 174/69; 174/68.3; 174/71 R; 439/34; 49/158

(58) Field of Classification Search ........... 174/72 A, 174/69, 72 C, 70 R, 68.3, 71 R, 72 R; 439/34, 439/501, 502; 296/146.1; 49/152, 158

See application file for complete search history.

(56) References Cited

U.S. PATENT DOCUMENTS 6,492,592 B1 * 12/2002 Murofushi et al. ....... 174/72 A
7,057,110 B2 * 6/2006 Tsubaki et al. ........... 174/72 A
7,220,129 B1 * 5/2007 Nishijima et al. ............ 439/34
2006/0027391 A1    2/2006 Tsubaki et al.
2007/0119610 A1 * 5/2007 Kisu et al. ................ 174/72 A

FOREIGN PATENT DOCUMENTS

| DE | 101 18 205 A1 | 10/2001 |
| EP | 1 551 087 A1 | 7/2005 |
| JP | 2003-335188 A | 11/2003 |

* cited by examiner

Primary Examiner—Dhiru R. Patel
(74) Attorney, Agent, or Firm—Sughrue Mion, PLLC

(57) ABSTRACT

A power supply device for realizing an electrical connection structure includes a wire harness arranged to electrically connect a body with a sliding door and having both ends fixed thereto and a bendable middle portion. A slider is arranged to contact the middle portion of the wire harness and move in synchronization with slide movement to guide the wire harness in a parallel direction. A box-shaped protector having a housing space to house the slider together with the middle portion of the wire harness therein is disposed on the sliding door. The slider is actuated toward the side to which a bent portion protrudes.

28 Claims, 13 Drawing Sheets

A-A'

B—B'

C—C'

ELECTRICAL CONNECTION STRUCTURE

CROSS-REFERENCE TO RELATED APPLICATION

This application is based upon and claims the benefit of priority from Japanese Patent Application Nos. 2006-57750, 2006-160601 and 2006-336100 filed on Mar. 3, 2006, Jun. 9, 2006 and Dec. 13, 2006 respectively, in the Japanese Patent Office, the disclosures of which are incorporated herein in their entirety by reference.

BACKGROUND OF THE INVENTION

1. Field of the Invention

The present invention relates to an electrical connection structure for electrically connecting a stationary member to a movable member relative to the stationary member. In particular, the present invention relates to an electrical connection structure applied to a sliding door in an automobile for electrically connecting various electrical components mounted on the sliding door to a body of the automobile.

2. Description of the Related Art

An example of related art electrical connection structures for electrically connecting a sliding door to a body in an automobile is disclosed in Patent Document 1 (JP 2003-335188A, paragraphs 0017-0021, FIGS. 1-4). This electrical connection structure comprises a power-supply harness protector configured to house a wire harness therein that is always bent upward with a leaf spring and led out through a slit-like opening.

The power-supply harness protector includes a guide formed in a curved or tilted shape in a longitudinal cross section along the opening, and a harness inducer formed at an end of the guide having a gradually curved or tilted shape in height. A harness lead-out outlet is formed adjacent to the harness inducer as following the opening in the structure.

In the related art electrical connection structure, the power-supply harness protector as described above is arranged on either the sliding door or the body, while a harness-fixing portion is arranged on the other, such that the outlet is located at the same height as the harness-fixing portion. This allows the wire harness to be horizontally led out through the outlet to the harness-fixing portion at a position where the sliding door is either fully closed or fully open. This structure is effective to prevent the wire harness from damaging.

In the related art electrical connection structure described above, the wire harness is always bent upward with the leaf spring within the power-supply harness protector. Therefore, the power-supply harness protector has a larger outside shape, which presses spacing for arranging electrical components in the sliding door and limits the flexibility of laying out electrical components.

In the related art electrical connection structure described above, the harness-fixing portion is attached to the body, but remains swingable in the front-rear direction of the body, for example, about a fixed axis of a bracket serving as a fulcrum. Therefore, realizing this structure requires an increased number of components and increases various costs such as production and assembly costs.

In the related art electrical connection structure described above, the wire harness is simply led out through the opening and the outlet of the power-supply harness protector toward the harness-fixing portion. Therefore, this structure allows foreign matter to enter the inside of the power-supply harness protector through the opening and the outlet, wherein the foreign matter may damage the wire harness and affect the movement of the wire harness within the harness protector.

In the related art electrical connection structure described above, the power-supply harness protector includes a protector body and a protector cover composed of a synthetic resin. Therefore, environmental variations such as variations in temperature and humidity can bend the protector itself and, if an extreme dimensional error arises, the effects may possibly prevent movement of a resilient member as the protector which actuates the wire harness.

The present invention has been made in consideration of such the problems and has an object to provide an electrical connection structure which may improve the flexibility of layout, reduce costs, support movement of the wire harness, reduce the effects of environmental variations, and achieve smooth movement.

SUMMARY OF THE INVENTION

Exemplary embodiments of the present invention overcome the above disadvantages and other disadvantages not described above and provide advantages which will be apparent from the following description of exemplary embodiments of the invention. Also, the present invention is not required to overcome the disadvantages described above.

The present invention provides an electrical connection structure for electrically connecting a stationary member to a slidably movable member relative to the stationary member. The structure comprises a wire harness having one end fixed to the stationary member and the other end fixed to the movable member, and a middle portion between the ends arranged to be bendable. The structure further comprises, a slider configured to guide the wire harness, including a harness contact portion arranged to contact the middle portion of the wire harness and move in synchronization with slide movement of the movable member, relative to the stationary member, in a direction parallel to the direction of slide movement. The harness contact portion includes a bent portion bent at a radius of curvature larger than the smallest radius of curvature at which the wire harness is bendable. The bent portion formed protruding toward either one of the opposite sides in the parallel direction. The structure also includes a support arranged to support the harness contact portion movable in the parallel direction, and a coupler arranged to couple the harness contact portion and the support. Further, the structure comprises a protector arranged on the movable member and shaped in the form of a box extending along the parallel direction. The protector including a separator arranged to separate a first housing chamber from a second housing chamber, wherein the first housing chamber is formed to house the harness contact portion of the slider together with the middle portion of the wire harness, and the second housing chamber is formed to house the support of the slider slidable along the parallel direction. The protector also includes an opening formed to lead the wire harness out of the first housing chamber toward a side of the separator opposite the side on which the second housing chamber is formed. Finally the structure comprises an actuator means arranged to actuate the slider by a restorative force thereof to pull the slider toward the side to which the bent portion protrudes.

In one aspect of the electrical connection structure according to the present invention, the support may include one or more concave trenches extending in the direction parallel to the direction of slide movement, wherein the slider further includes one or more buffers provided at least partly in the direction of the concave trench extending in the support, and the protector may further one or more rails provided in the second housing chamber over the entire movement range of the slider, extending in the direction parallel to the direction of slide movement, having a tip pressed against the buffer and interposed in the concave trench so as to regulate movement of the slider. In this case, the concave trenches may be formed on both sides of the support, and the rail may be formed in a C-shape having an upper aperture in the cross section wherein the rail is configured such that a pair of tips that form the C-shape are pressed against the buffers and interposed in the concave trenches to regulate movement of the slider. In addition, the concave trenches may be formed on both sides of the support, wherein the rails may be formed on both of the opposite inner walls of the second housing chamber in the protector. The concave trench may also be formed on at least one of the top surface and the bottom surface of the support, wherein the rail may be formed on an inner wall opposite the concave trench of the second housing chamber in the protector. In one aspect of the present invention, the buffers may be further provided in the concave trenches. In one aspect of the present invention, the buffer in the slider may be composed of felt material.

The coupler may have a crank-like bent shape in cross section.

The actuator means may include a tensile spring having one end fixed to an inner wall of the second housing chamber of the protector present in the direction of slide movement and the other end fixed to an outer circumferential surface of the support of the slider arranged opposite the inner wall.

In one aspect of the present invention, the actuator means may include a bobbin rotatably supported about an axis within the protector, and a resilient member having one end fixed to the bobbin and the other end fixed to the support of the slider, wherein the resilient member is molded to be transformable between a flat plate and a spiral in accordance with slide movement of the slider and actuated to wind around the bobbin. In this case, the resilient member in the actuator means may include a spiral spring of metal having a load property that achieves an almost constant load relative to the amount of movement of the slider if the distance from the slider to the bobbin exceeds a certain length. The support of the slider may include, on the outer circumferential surface that slidably contacts the inner wall of the second housing chamber, a plurality of convex resilient portions arranged to directly contact the inner wall. The resilient portions on the support of the slider may be cantilevered.

In one aspect, the protector includes a cabinet body with the second housing chamber formed therein, and a cabinet cover with the separator formed therein wherein the cabinet cover is detachably attached to the cabinet body. In another aspect, the wire harness may be structured to contain a plurality of electric wires which are bundled and covered in a protective member.

In one aspect, the protective member may be composed of Colgate material. Additionally, in one aspect of the present invention, the stationary member is a body of an automobile, and the movable member is a sliding door attached to the body of the automobile.

In accordance with another aspect of the present invention, the middle portion of the bendable wire harness that connects the stationary member to the movable member, together with the slider actuated by the actuator means to guide the wire harness in the direction of slide movement of the movable member, is housed in the box-shaped protector that is arranged on the stationary member or the movable member and extends along the direction of slide movement. Therefore, it is possible to downsize the outside shape of the protector and improve the flexibility of laying out electric components.

In accordance with an aspect of the present invention, it is not required to provide the so-called conventional swinging mechanisms at both ends of the wire harness fixed to the stationary member and the movable member, respectively. Thus, it is possible to reduce the number of components to realize the electrical connection structure to lower the cost. In accordance with an aspect of the present invention, the middle portion of the wire harness and the harness contact portion of the slider are separated at the second housing chamber of the protector for receiving the support of the slider housed therein, by the separator, and housed in the first housing chamber. Therefore, even if foreign matters mix through the opening of the protector into the first housing chamber, they can be prevented from further mixing into the second housing chamber. Thus, it may be possible to prevent an operational failure of the slider and to smoothly move the wire harness.

In accordance with an aspect of the present invention, the tips of the rails provided in the second housing chamber are interposed in the concave trenches in the support of the slider while pressing the buffers. Therefore, it is possible to realize a structure that is hardly affected by environmental variation which may prevent movement of the slider. It also may be possible to prevent rattling of the slider during movement in the protector and to reliably move the slider.

In accordance with another aspect of the present invention, the outer circumferential surface, which slidably contacts the inner wall of the second housing chamber in the support of the slider, is provided with a resilient portion that directly contacts the inner wall. Therefore, it may be possible to prevent rattling of the slider during movement in the protector and to reliably move the slider. In accordance with an aspect of the present invention, the actuator means includes a bobbin, rotatably supported about an axis within the protector, and a resilient member having one end fixed to the bobbin and the other end fixed to the support. The resilient member is molded to be transformable between a flat plate and a spiral in accordance with slide movement and actuated to wind around the bobbin. Therefore, it may be possible to reliably move the slider with a simple structure and guide the wire harness smoothly.

DETAILED DESCRIPTION OF THE EMBODIMENTS

A first embodiment of the present invention will now be described below with reference to the accompanying drawings. Like reference numbers will denote like elements.

Figure 1:
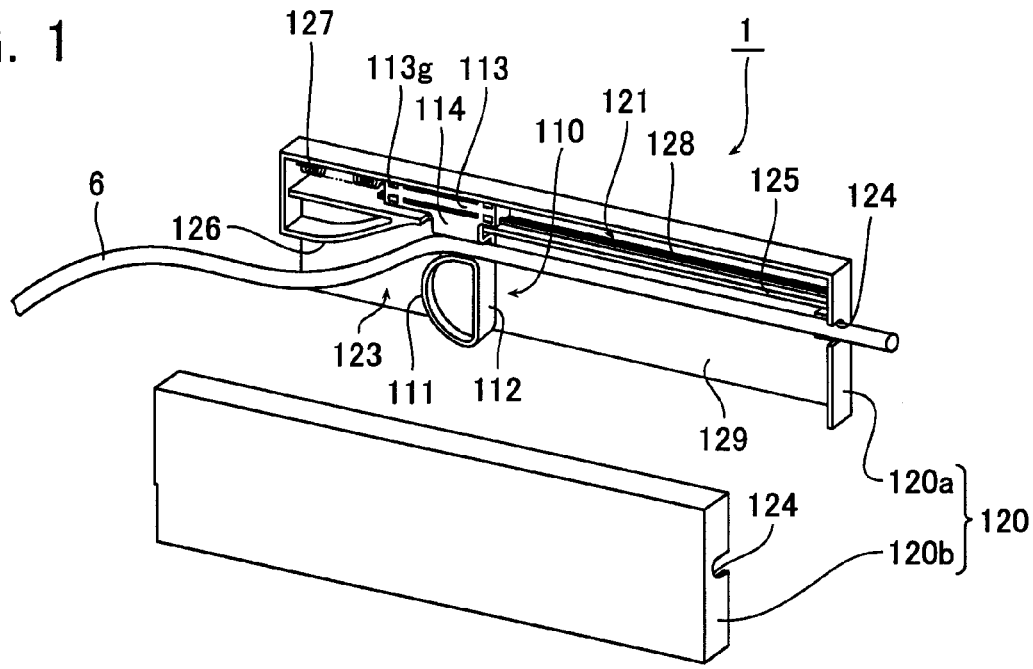
FIG. 1 is an exploded perspective view illustrative of an electrical connection structure according to an exemplary embodiment of the present invention.
Figure 2:
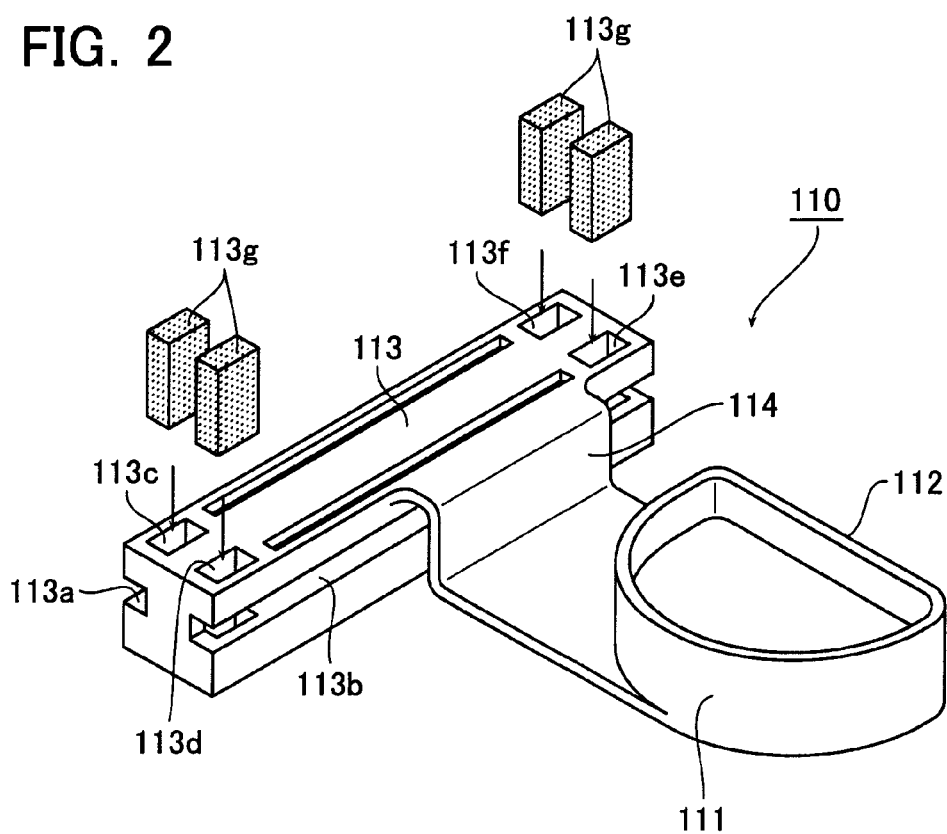
FIG. 2 is an external perspective view illustrating an example of a slider in the electrical connection structure.
Figure 3:
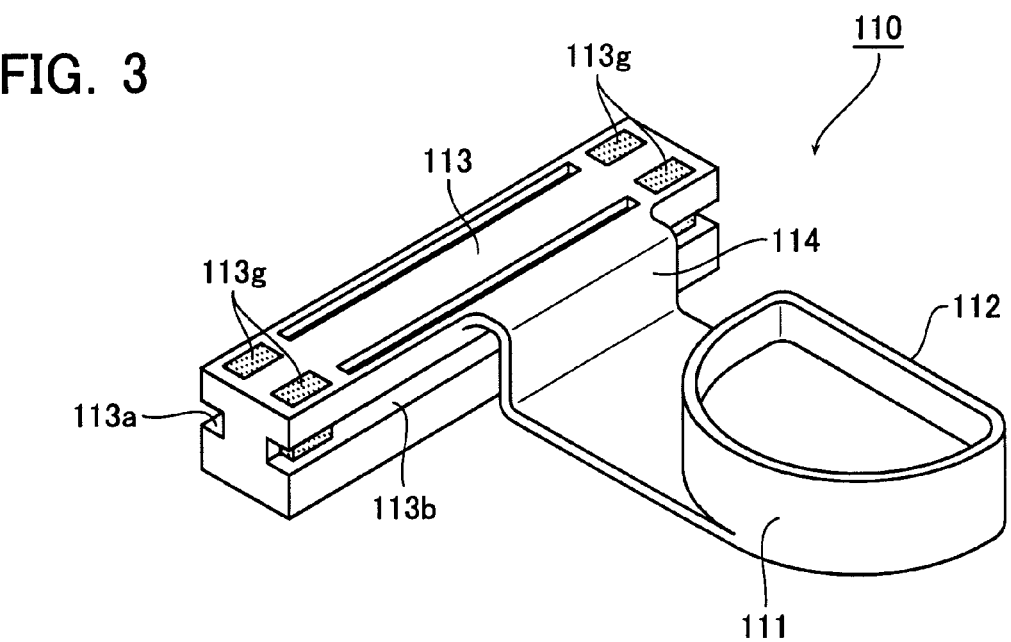
FIG. 3 is an external perspective view illustrating an example of the slider in the electrical connection structure.
Figure 4:
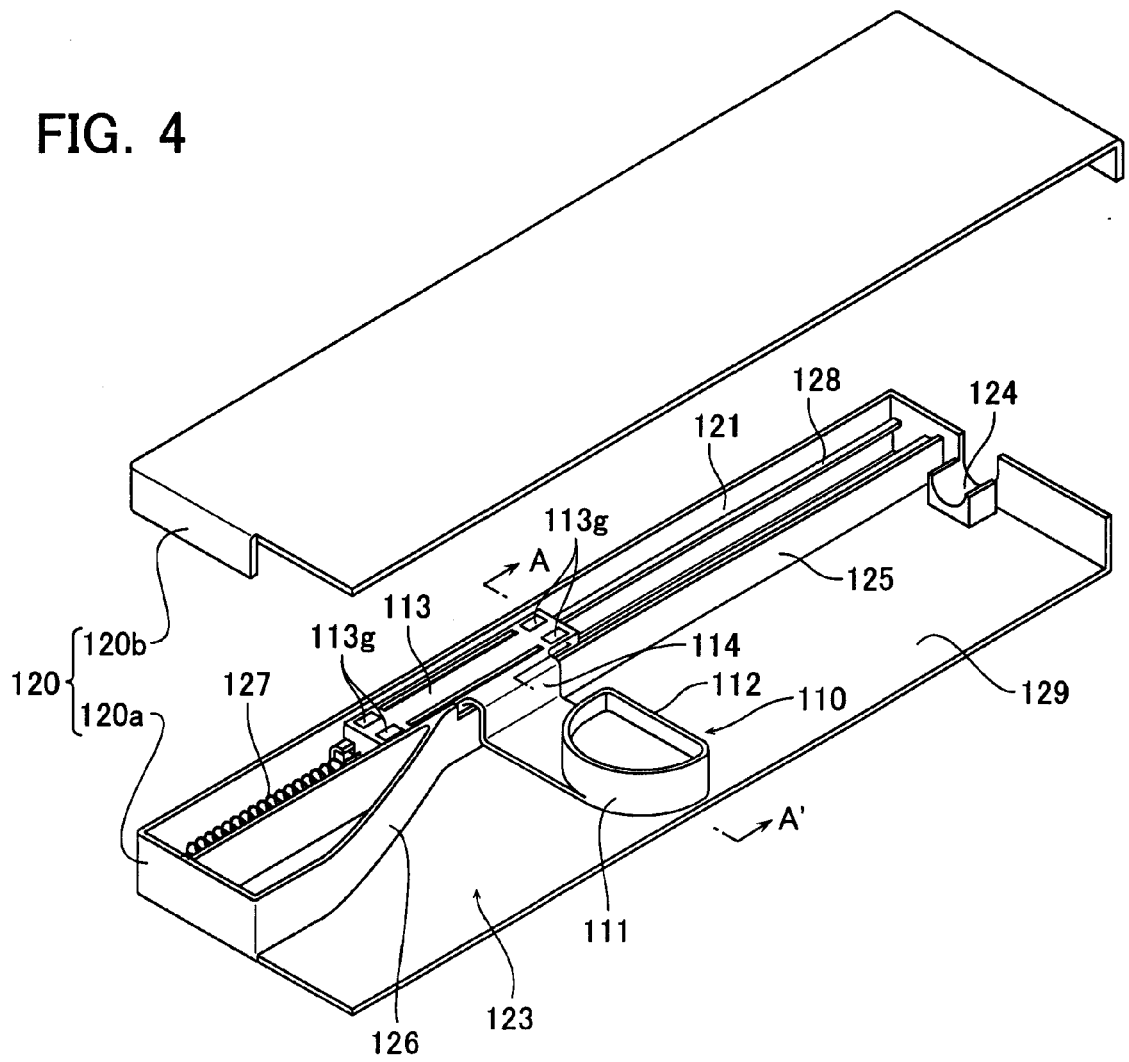
FIG. 4 is an exploded perspective view illustrative of an arrangement relation between the slider and a protector according to an exemplary embodiment of the present invention.
Figure 5:
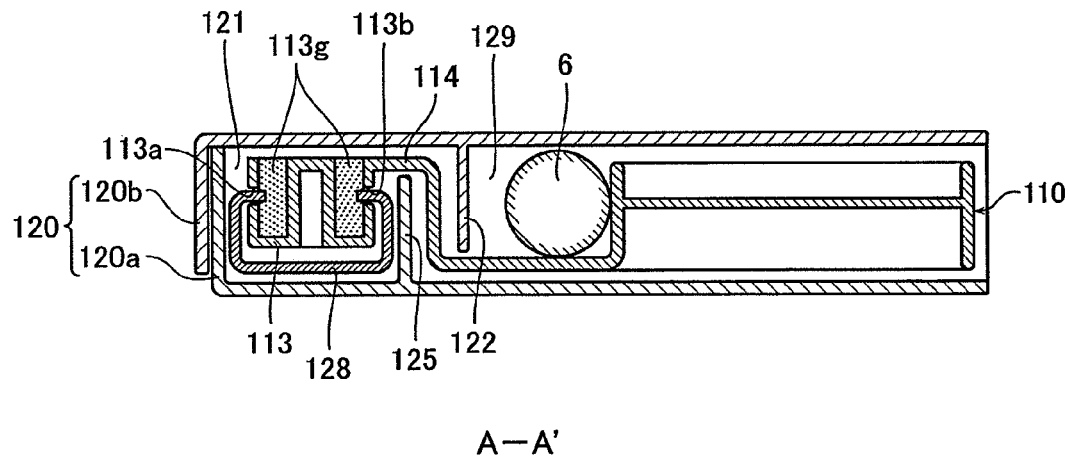
FIG. 5 is a cross-sectional view taken along A-A' in FIG. 4 after a wire harness is arranged in accordance with the electrical connection structure.

FIG. 1 is an exploded perspective view illustrative of an electrical connection structure according to an exemplary embodiment of the present invention. FIGS. 2 and 3 are external perspective views illustrating examples of a slider in the electrical connection structure. FIG. 4 is an exploded perspective view illustrating an example of an arrangement relation between the slider and a protector. FIG. 5 is a cross-sectional view taken along A-A' in FIG. 4 after a wire harness is arranged in accordance with the electrical connection structure.

Figure 6:
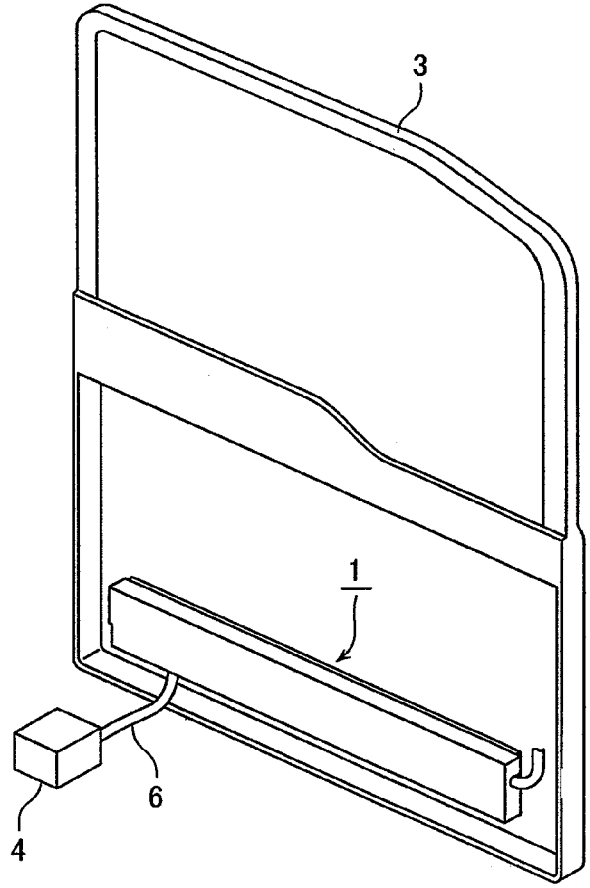
FIG. 6 is a perspective view illustrative of an example of the electrical connection structure disposed on a sliding door of an automobile.
Figure 7:
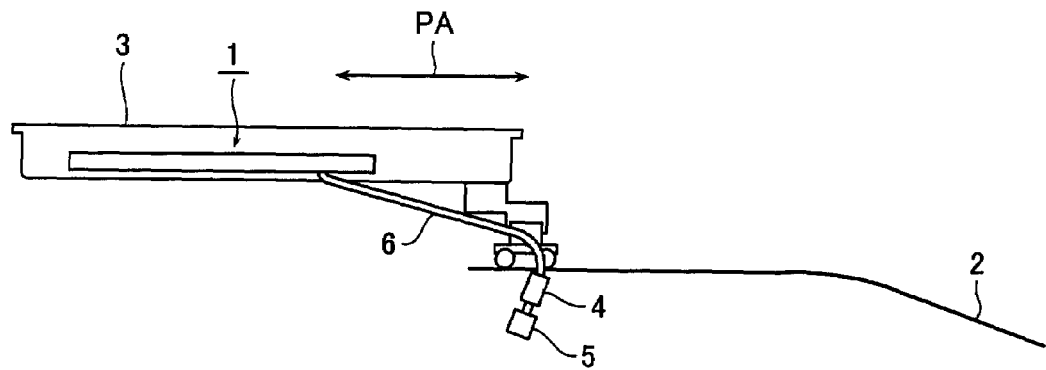
FIG. 7 is a top view illustrating an example of operation of the electrical connection structure.
Figure 8:
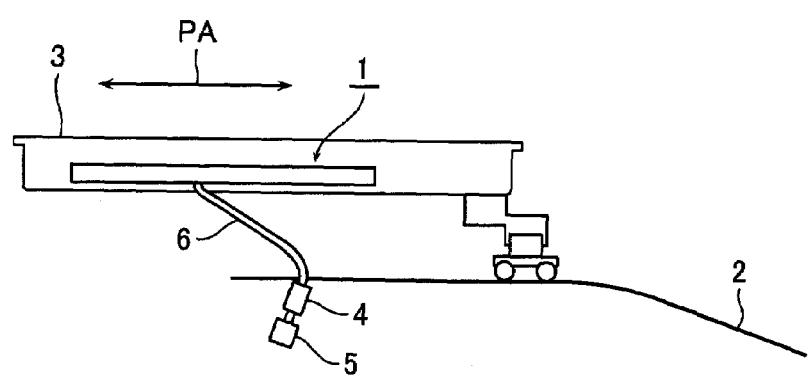
FIG. 8 is a top view illustrating an example of operation of the electrical connection structure.
Figure 9:
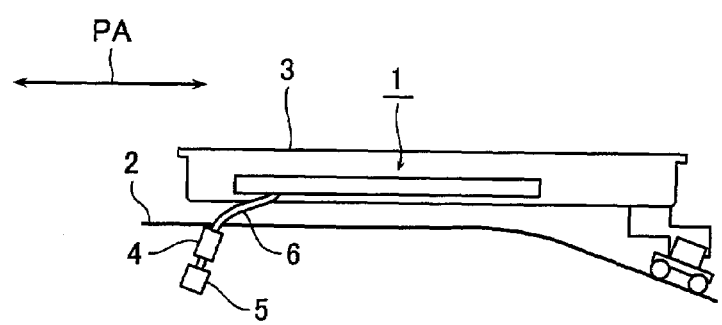
FIG. 9 is a top view illustrating an example of operation of the electrical connection structure.
Figure 10:
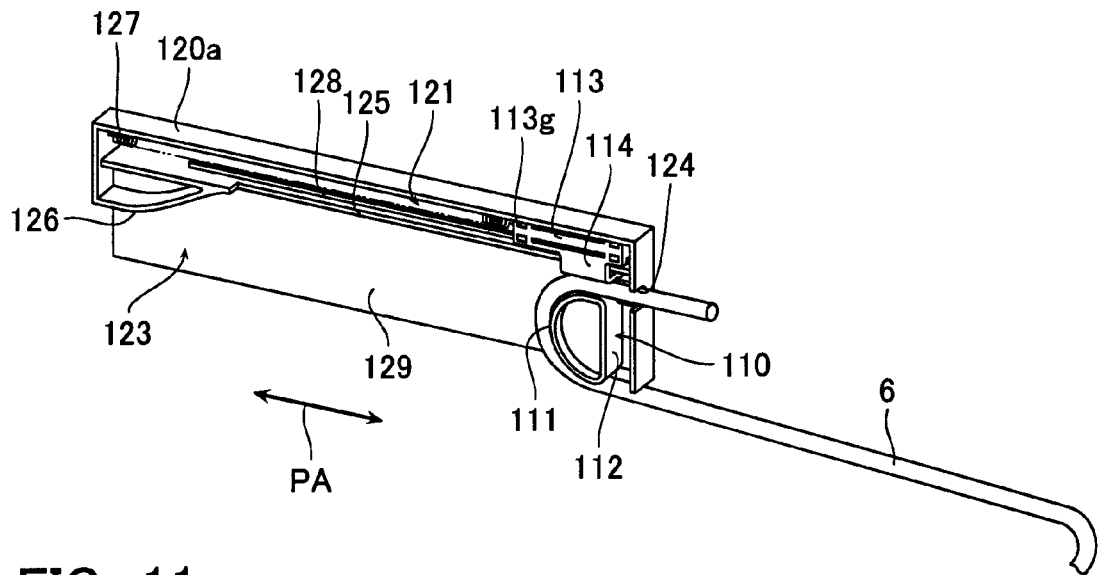
FIG. 10 is a perspective view illustrating an example of the movement of various portions in the electrical connection structure.
Figure 11:
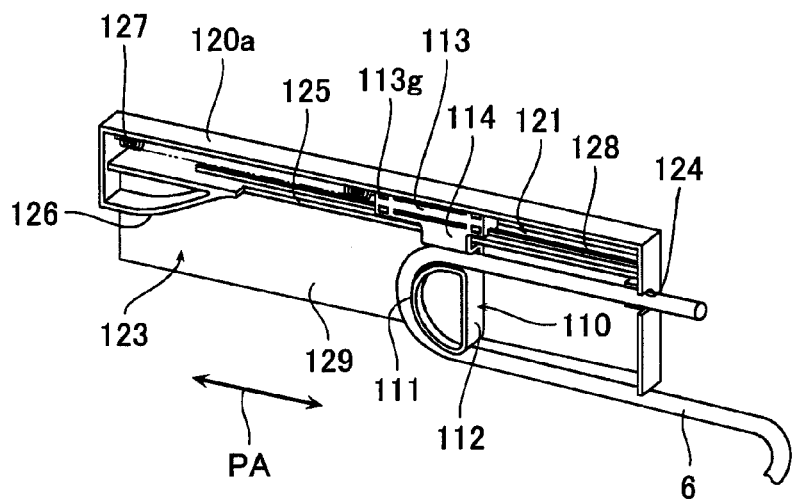
FIG. 11 is a perspective view illustrating the movement of various portions in the electrical connection structure according to an exemplary embodiment of the present invention.
Figure 12:
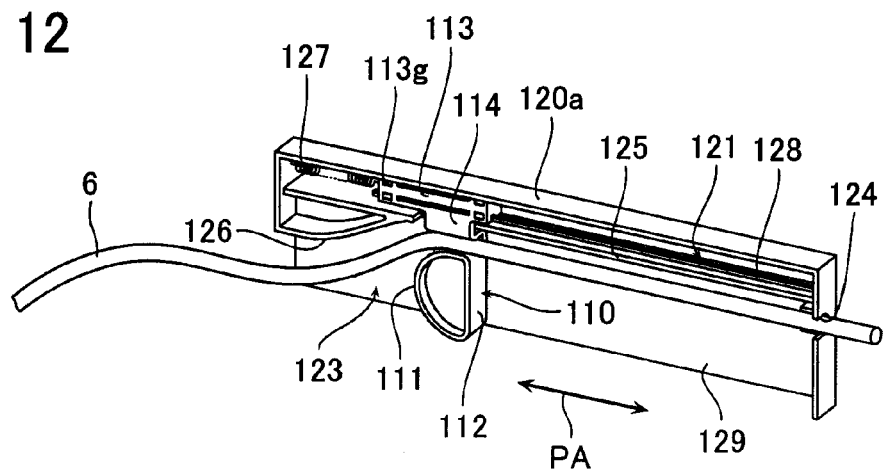
FIG. 12 is a perspective view illustrating the movement of various portions in the electrical connection structure according to an exemplary embodiment of the present invention.
Figure 13:
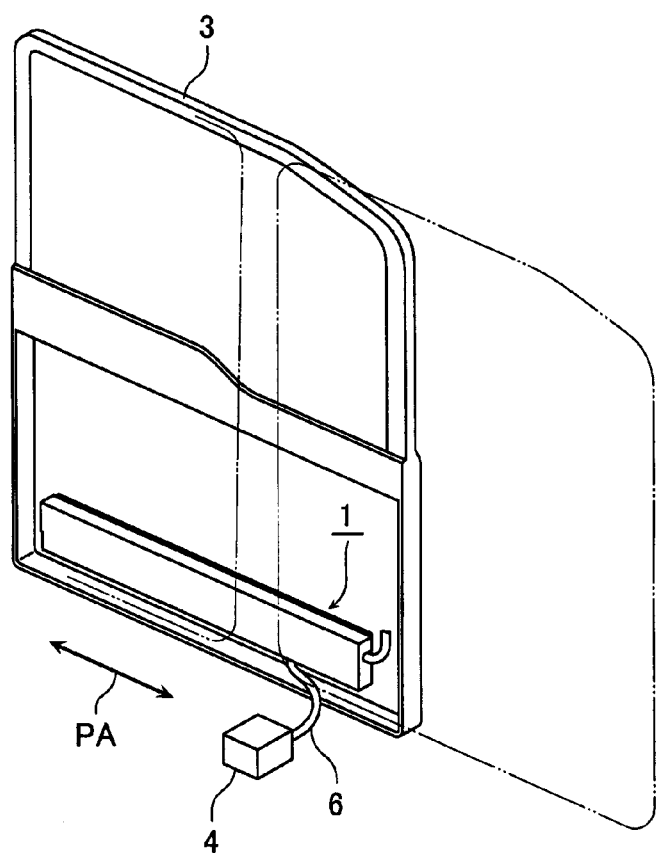
FIG. 13 is a perspective view illustrating the movement of various portions in the electrical connection structure shown from the inside of the automobile according to an exemplary embodiment of the present invention.
Figure 14:
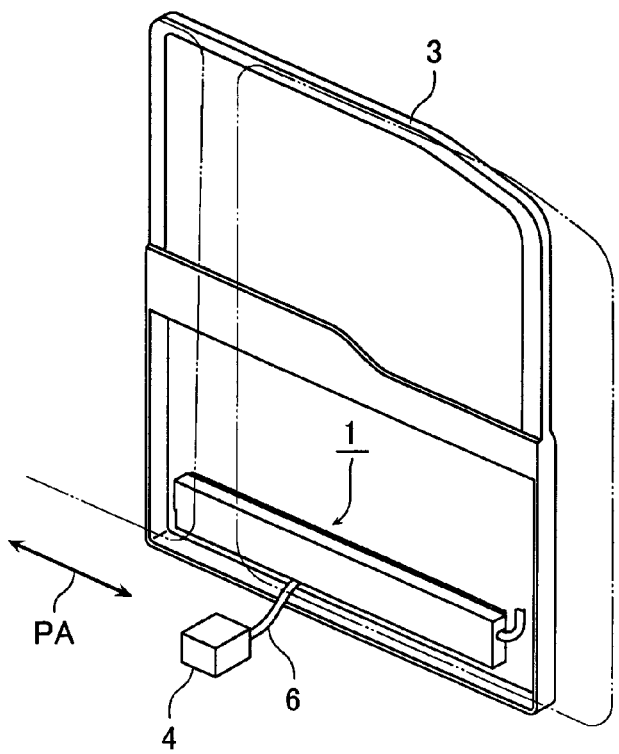
FIG. 14 is a perspective view illustrating the movement of various portions in the electrical connection structure shown from the inside of the automobile according to an exemplary embodiment of the present invention.
Figure 15:
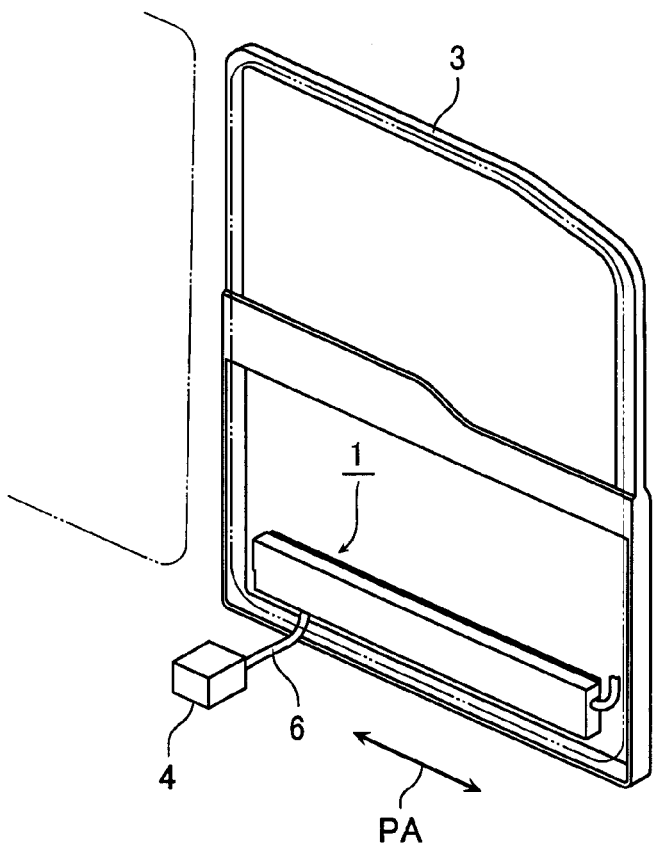
FIG. 15 is a perspective view illustrating the movement of various portions in the electrical connection structure shown from the inside of the automobile according to an exemplary embodiment of the present invention.

FIG. 6 is a perspective view illustrative of the electrical connection structure applied to a sliding door of an automobile according to an exemplary embodiment of the present invention. FIGS. 7-15 are illustrative views of operation from a full-closed position to a full-open position of the sliding door to which the electrical connection structure, according to an exemplary embodiment of the present invention, is applied. FIGS. 7-9 are top views illustrating examples of operation of the electrical connection structure. FIGS. 10-12 are perspective views illustrating examples of movements of various portions in the electrical connection structure. FIGS. 13-15 are perspective views illustrating movement of various portions in the electrical connection structure shown from the inside of the automobile.

As shown in FIG. 1, the power supply device 1 for realizing the electrical connection structure according to an exemplary embodiment is used to electrically connect a body 2 of an automobile (see FIGS. 7-9 now and similarly hereafter) as a stationary member, with a sliding door 3, as a movable member, wherein the sliding door 3 is slidably movable relative to the body 2 in a direction of slide movement or a direction of the arrow PA (hereinafter referred to as "PA direction") in FIGS. 7-15 (see FIGS. 6-9 now and similarly hereafter). In this example, a power supply circuit and so forth in the power supply device 1 are omitted from the following description, and it is assumed that the sliding door 3 is attached to the body 2 on the left side.

The power supply device 1 includes a slider 110 configured to guide a wire harness 6, and a protector 120 configured to house the slider 110 therein. The wire harness 6 has one end fixed to the body 2 through a harness fixing portion 4 (see FIGS. 6-9 and 13-15 now and similarly hereafter) and a connector 5 (see FIGS. 7-9 now and similarly hereafter). The wire harness 6 has the other end fixed to the sliding door 3, and a middle portion between both ends bendably arranged from the body 2 to the sliding door 3.

Specifically, the one end of the wire harness 6 is connected through the connector 5 to a wire in the body 2(not shown) and fixed to the harness fixing portion 4. The other end thereof is connected through a connector(not shown) with electric components (not shown) such as a power window on the sliding door 3 and fixed thereto. Thus, the electrical connection structure of this example does not require the ends of the wire harness 6 to be fixed using the conventional swinging mechanism.

The wire harness 6 is structured to contain a plurality of bundled electric wires having outer circumferences covered in a protective member. The protective member is composed of Colgate material in one exemplary embodiment of the present invention. The wire harness 6 is configured to have appropriate flexibility and elasticity to become bendable. The above PA direction indicates the front-rear direction of the body 2. Hereinafter, "front-rear" indicates the direction coincident with the front and rear of the body 2 unless a particular description is given clearly.

The slider 110 contacts the middle portion of the wire harness 6 and moves in synchronization with slide movement of the sliding door 3 in a relative direction parallel to the PA direction (hereinafter referred to as "parallel direction") to guide the wire harness 6 in the front-rear direction. In one exemplary embodiment of the present invention the slider 110 is composed of a resinous molding material and includes a harness contact portion 112 as shown in FIGS. 1-4. A support 113 is arranged to support the harness contact portion 112. A coupler 114 is arranged to couple the harness contact portion 112 and the support 113. The harness contact portion 112 has a bent portion 111 with a curved surface bent at a radius of curvature larger than the smallest radius of curvature at which the wire harness 6 is bendable. In this case, the bent portion 111 protrudes toward either one of the opposite sides in the parallel direction, for example, toward the rear side.

The support 113 supports the harness contact portion 112 movable relative to the protector 120 in the parallel direction. In addition, the support 113 includes a pair of recesses, or concave trenches, 113a and 113b having apertures in a direction orthogonal to the parallel direction and formed (extended) along the parallel direction. The support 113 also includes a plurality of holes 113c-113f formed in communication with the recesses 113a and 113b from the outer circumferential surface. The holes 113c-113f in the support 113 receive buffers 113g composed, for example, of felt material inserted therein to block parts of the recesses 113a and 113b (portions near both ends in the parallel direction), respectively. The pair of recesses 113a and 113b in the support 113 engage later-described rails of metal such that the buffers 113g slidably contact them.

The coupler 114 has a crank-like bent shape in the cross section to couple the harness contact portion 112 and the support 113. In actual use of the power supply device 1 for realizing the electrical connection structure of this example, the slider 110 allows the middle portion of the wire harness 6 to be so arranged so as to surely pass through the recessed portion in the coupler 114 between the harness contact portion 112 and the support 113. The middle portion of the wire harness 6 when it is bent most is bent along the curved surface of the bent portion 111 of the harness contact portion 112.

The protector 120 is disposed on the sliding door 3 and is shaped as a box having the longitudinal direction of the box extending in the front-rear direction. In one exemplary embodiment the protector 120 is composed of a resinous molding material like the slider 110. The protector 120 includes, as shown in FIGS. 1, 4 and 5, a first housing chamber, or housing space, 129 formed to house the harness contact portion 112 of the slider 110 and the middle portion of the wire harness 6. A second housing chamber, or housing space, 121 is formed to house the support 113 of the slider 110. A separator 122 is arranged to partition these chambers from each other. An opening 123 is formed to lead out the wire harness 6 to its external connections. The rails of metal 128 are provided in the housing chamber 121 to engage the recesses 113a and 113b in the support 113 of the slider 110 and slidably contact the buffers 113g. An actuator means, or a tensile spring, 127 is arranged to actuate the slider 110.

The protector 120 may be formed of two parts, a cabinet body 120a having the housing chamber 121 formed therein, and a cabinet cover 120b having the separator 122 formed therein and detachably attached to the cabinet body 120a. Providing such a dividable structure allows the power supply device 1 to improve accessibility to the inside of the protector 120 on maintenance of the wire harness 6 and the slider 110. Providing the separator 122 can partition the housing chamber 121 from the housing chamber 129 spatially.

The housing chamber 129 houses the middle portion of the wire harness 6, which is movable in the parallel direction together with the harness contact portion 112 of the slider 110. The housing chamber 121 houses the rail of metal 128, which has a C-shape in cross section and is directly attached to the housing chamber 121 using screws (not shown). In addition, the rail 128 has opposite ends, which sandwich a slit therebetween and are fitted in the pair of the recesses 113a and 113b in the support 113 of the slider 110. Thus, the support 113 is engaged and housed in the housing chamber 121, so as to be slidably movable in the parallel direction.

The rail 128 may be formed in any cross-sectional shape that forms opposite ends that engage the recesses 113a and 113b, other than the C-shape in cross section. In one exemplary embodiment, the rail 128 may be composed of a metal material such as aluminum (Al), iron (Fe), and stainless steel (SUS). The separator 122, shown in FIG. 5, may include a partition such as a projection which is formed protruding in a direction of extension along the longitudinal direction of the protector 120 and connection of the cabinet body 120a with the cabinet cover 120b (hereinafter referred to as "horizontal direction").

The opening 123 is formed to reliably lead the wire harness 6 out of the housing chamber 129, on the side of the separator 122 opposite the side on which the housing chamber 121 is formed. The opening 123 may be formed by opening part of the rear sidewall and the lower sidewall of the protector 120. A lead-out outlet 124 is formed through part of the front sidewall of the protector 120 to lead out the wire harness 6 to the fixing portion on the sliding door 3.

The tensile spring 127 has one end fixed to a rear inner wall of the housing chamber 121 of the protector 120 present in the parallel direction and the other end fixed to an outer circumferential surface of the support 113 of the slider 110 arranged opposite the inner wall. The tensile spring actuates the slider 110 by a restorative force thereof, for example, to pull the slider 110 toward the side to which the bent portion 11 protrudes.

In one embodiment of the present invention, the tensile spring 127 may have the so-called constant load property that makes a load relative to the amount of movement of the slider 110 (that is, a tensile force acting on the rear inner wall) almost constant if the distance from the slider 110 to the rear inner wall of the housing chamber 121 in the parallel direction exceeds a certain length.

When the tensile spring 127 has the constant load property, the slider 110 can smoothly move within the protector 120. Therefore, it is possible to guide the wire harness 6 reliably in response to movement of the sliding door 3.

The power supply device 1, having the electrical connection structure thus configured, houses the middle portion of the wire harness 6 together with the slider 110 in the box-shaped protector 120 having the longitudinal direction extending along the front-rear direction. It also realizes the structure that houses the tensile spring 27 operative to actuate the slider 110 in the housing chamber 121 of the protector 120. Therefore, the outside shape of the protector can be smaller.

Accordingly, it is possible to keep wider arrangement spaces for various electric components as shown in FIG. 6, for example, if the power supply device 1 is disposed on the sliding door 3. As a result, the flexibility of layout can be improved. In this case, an extra length of the wire harness 6 can be absorbed within the housing space 129 of the protector in synchronization with operation of the slider 110 within the protector 120 from the maximum movement to the minimum movement realized by the tensile spring 127.

In accordance with the power supply device 1 thus configured, when the sliding door 3 is slid rearward to a full-open position relative to the body 2 in the front-rear direction as shown in FIGS. 7, 10 and 13, the wire harness 6 is held in the following state. The middle portion of the wire harness 6 in the housing chamber 129 bends while it contacts the harness contact portion 112 and the coupler 114 of the slider 110 and receives an almost constant tension from the tensile spring 127. The bent portion 111 prevents the middle portion of the wire harness 6 from folding smaller than the minimum radius of curvature. Therefore, extra stresses such as excessive tension and compression can not act on the middle portion of the wire harness 6.

When the sliding door 3 is slid forward to a midpoint between the full-open position and a full-closed position in the front-rear direction as shown in FIGS. 8, 11 and 14, the wire harness 6 is held in the following state. The middle portion of the wire harness 6 in the housing chamber 129 bends while it contacts the harness contact portion 112 and the coupler 114 of the slider 110 and receives an almost constant tension from the tensile spring 127, like the above. The bent portion 111 still regulates the folded shape as described above.

Finally, when the sliding door 3 is slid forward to the full-closed position in the front-rear direction as shown in FIGS. 9, 12 and 15, the wire harness 6 is held in the following state. The middle portion of the wire harness 6 in the housing chamber 129 contacts the harness contact portion 112 and the coupler 114 of the slider 110 but does not contact the bent portion 111 and remains almost straight. In this state, some tensile force may arise in the front-rear direction relative to the middle portion of the wire harness 6. Even in such the case, a regulative wall 126 formed in the housing space 129 retains the shape of the middle portion of the wire harness 6.

With such a series of moves of the sliding door 3, the support 113 of the slider 110 can move without rattling within the housing chamber 121 of the protector 120. This is because the paired recesses 113a and 113b are engaged with the opposite ends of the rail 128 through the buffers 113g, which are slidably movable in the parallel direction. In other words, the tips of the rail 128 provided in the housing chamber 121 are pressed against the buffers 113g and interposed in the recesses 113a, 113b. Herewith, the tensile spring 127 allows the slider 110 to move smoothly.

It is also possible to realize slide movement in a state in which the separator 122 separates the housing chamber 121 from the housing chamber 129 spatially. A wall 125 is positioned on a boundary between the housing chamber 121 and the housing chamber 129 provided in the cabinet body 120a. When the separator 122 serves as a first separation wall, the wall 125 is configured to serve as a second separation wall that prevents foreign matters from further mixing into the housing chamber 121. Therefore, it is possible to move the slider 110 smoothly and surely. It is also possible to guide the wire harness 6 without preventing movement of the slider 110 even if foreign matters mix through the opening 123 into the housing chamber 129.

Further, the support 113 of the slider 110 can move in the parallel direction while it engages the rail 128 provided in the housing chamber 121. In this exemplary embodiment, the cabinet body 120a and the cabinet cover 120b, in which make up the protector 120, may vary the shape thereof due to environmental variations such as variations in temperature and humidity, or due to an error in the dimension thereof. Even in such the case, it is possible to surely continue movement of the slider 110 and guide the wire harness 6 without affecting the rail 128.

The power supply device 1 for realizing the electrical connection structure according to the above exemplary embodiment is described as having the structure in which the paired recesses 113a and 113b formed in the support 113 of the slider 110 engage the opposite ends of the rail 128. Additionally, a new recess may be made open in a direction orthogonal to the direction of connection between the recesses 113a and 113b. In addition, a protrusion capable of engaging the recess is formed at a position effective to close the housing chamber 121 in the cabinet cover 120b. In this structure, the new recess engages the protrusion.

The power supply device 1 of the above exemplary embodiment is described as applied to supplying power between the body 2 and the sliding door 3 in the automobile. Besides, it is also applicable to power supplying from one to the other between the stationary member and the movable member in vehicles such as trains, aircraft and facilities having various attractions.

The power supply device 1 of the above exemplary embodiment is described as installed on the sliding door 3 that is attached to the body 2 on the left side. Alternatively, it is also applicable to a power supply device 1 installed on a sliding door that is attached to the body 2 on the right side.

Another exemplary embodiment of the present invention is described next with reference to the accompanying drawings.

Figure 16:
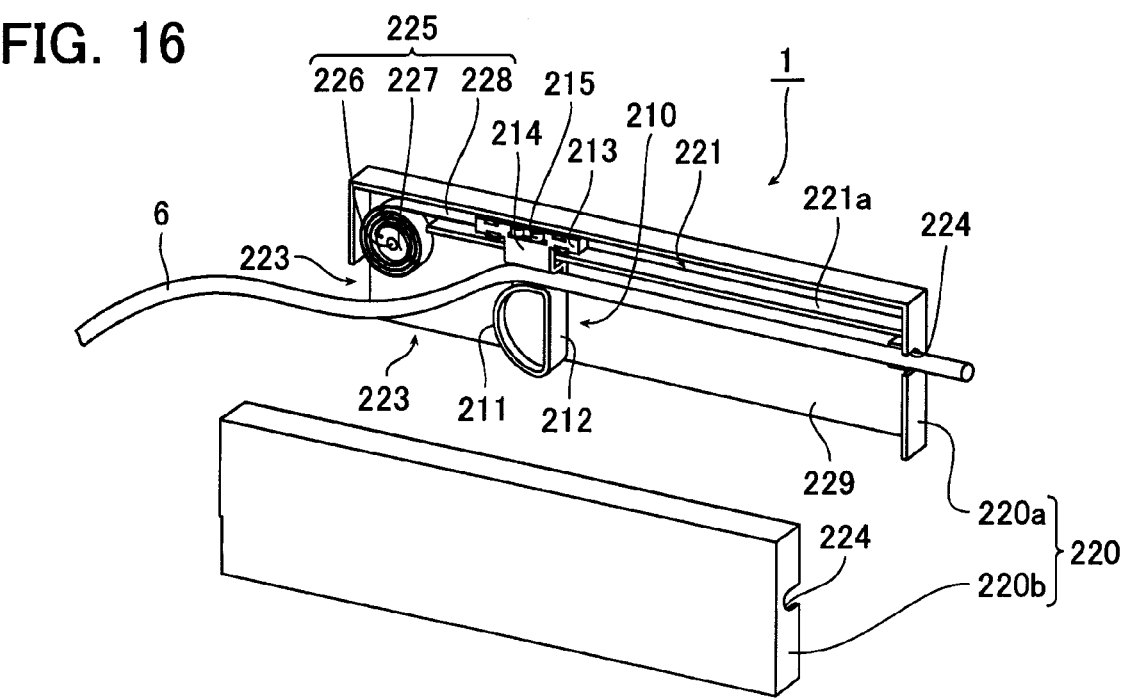
FIG. 16 is an exploded perspective view illustrative of an electrical connection structure according to another exemplary embodiment of the present invention.
Figure 17:
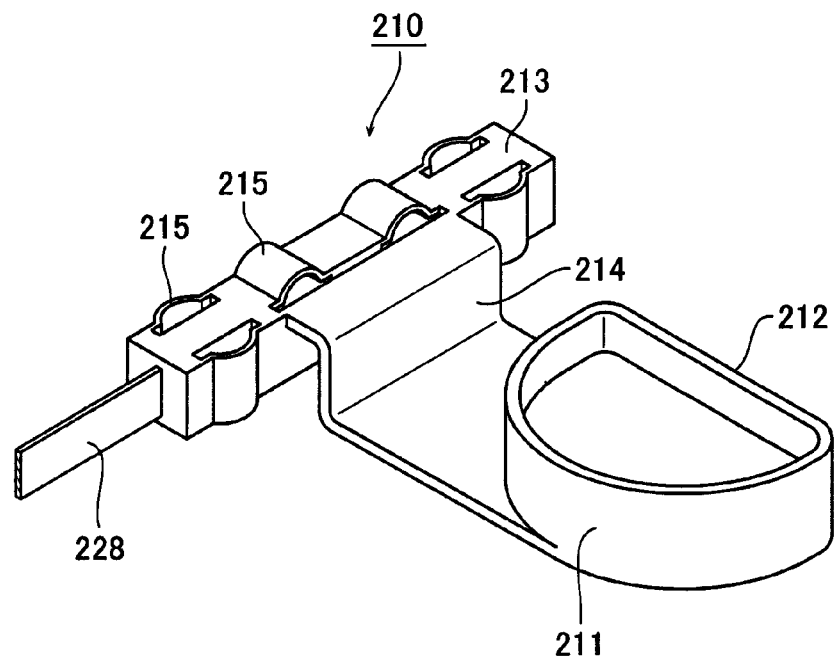
FIG. 17 is an external perspective view illustrative of a slider in the electrical connection structure according to an exemplary embodiment of the present invention.
Figure 18:
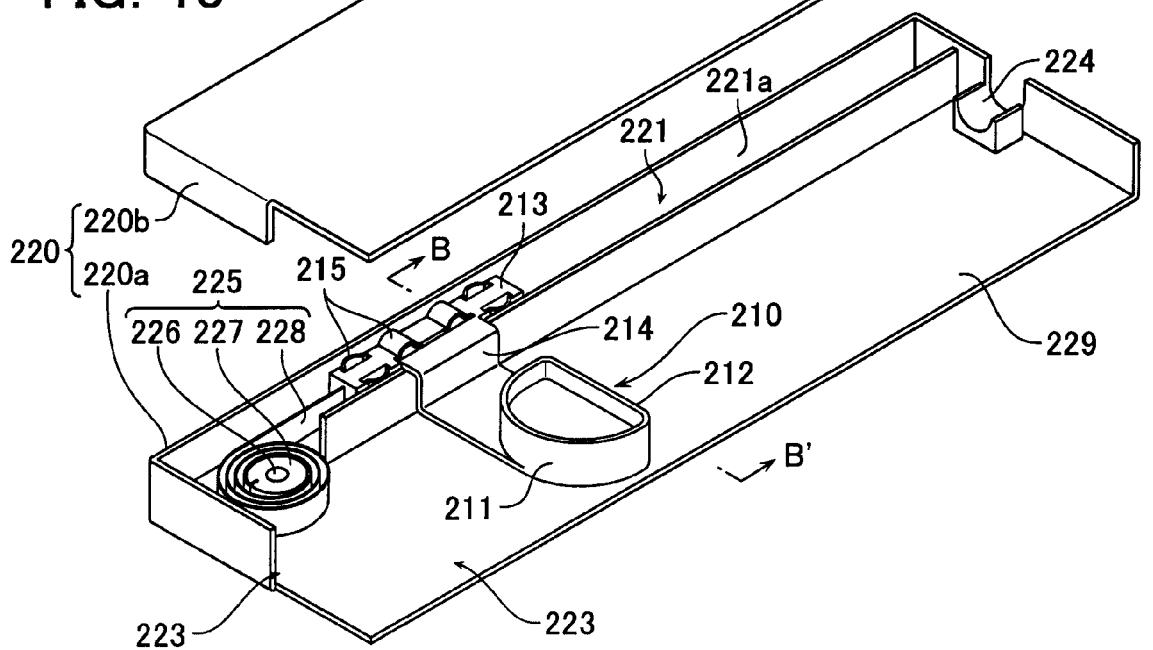
FIG. 18 is an exploded perspective view illustrating an example of an arrangement relation between the slider and a protector.
Figure 19:
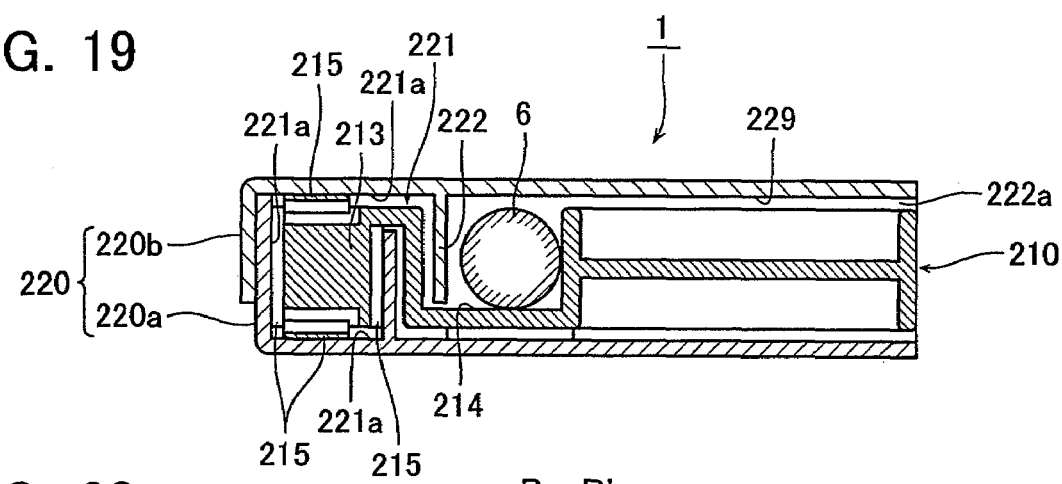
FIG. 19 is a cross-sectional view taken along B-B' in FIG. 18 after a wire harness is arranged in accordance with the electrical connection structure.

FIG. 16 is an exploded perspective view illustrative of an electrical connection structure according to another exemplary embodiment of the present invention. FIG. 17 is an external perspective view illustrative of an example of a slider in the electrical connection structure. FIG. 18 is an exploded perspective view illustrating an example of an arrangement relation between the slider and a protector. FIG. 19 is a cross-sectional view taken along B-B' in FIG. 18 after a wire harness is arranged in accordance with the electrical connection structure.

Figure 20:
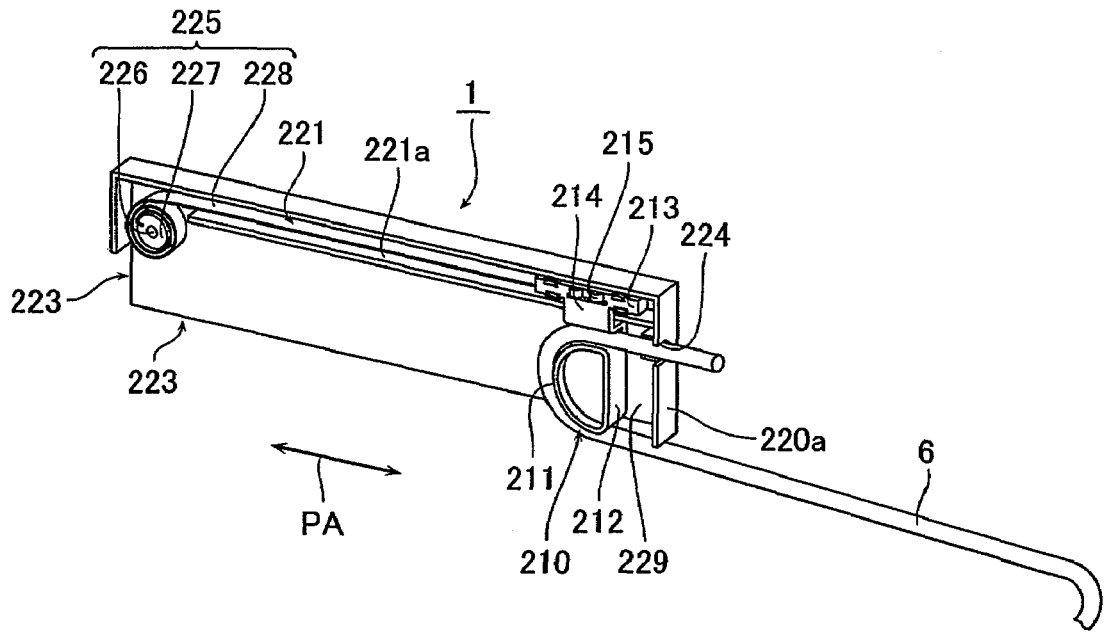
FIG. 20 is a perspective view illustrating an example of movement of various portions in the electrical connection structure.
Figure 21:
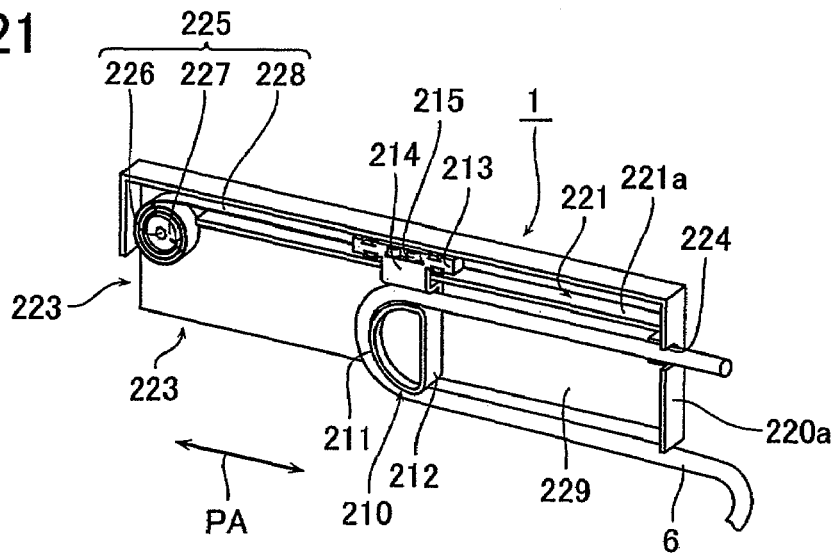
FIG. 21 is a perspective view illustrating another example of movement of various portions in the electrical connection structure.
Figure 22:
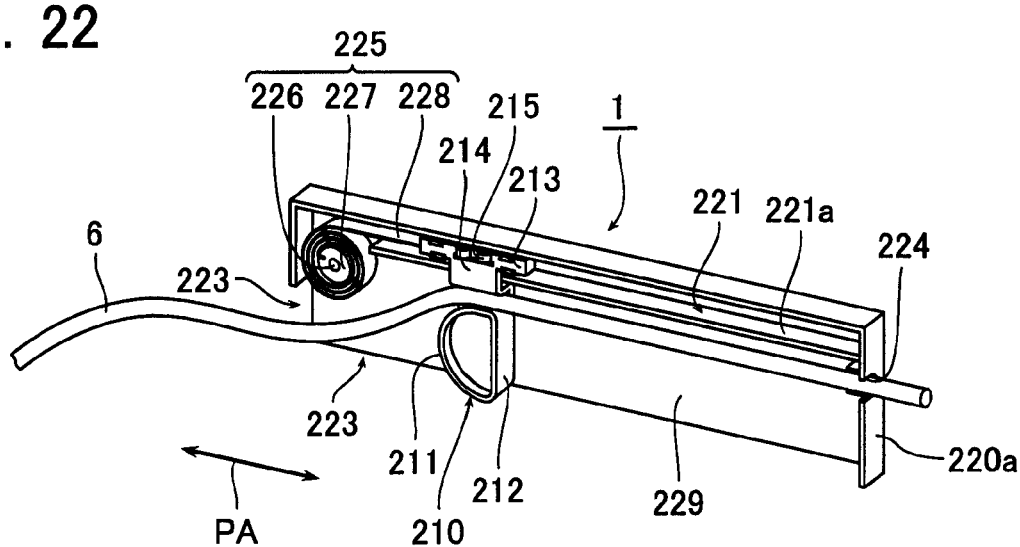
FIG. 22 is a perspective view illustrating another example of movement of various portions in the electrical connection structure.

FIGS. 20-22 are prospective views illustrating examples of movements from the full-open position to the full-closed position of the sliding door with the electrical connection structure applied thereto, including examples movements of various portions in the electrical connection structure.

The power supply device 1 for realizing the electrical connection structure according to this exemplary embodiment is used to electrically connect the body 2 with the sliding door 3 in the automobile. Also in this example, a power supply circuit and so forth in the power supply device 1 are omitted from the following description, and it is assumed that the sliding door 3 is attached to the body 2 on the left side. The power supply device 1 includes a wire harness 6, a slider 210, and a protector 220.

The slider 210 includes a harness contact portion 212, a support 213 and a coupler 214, similar to the exemplary embodiment described above. In this exemplary embodiment, the coupler 214 has a crank-like bent shape in cross section to couple the harness contact portion 212 and the support 213.

The support 213 includes a plurality of resilient portions 215 on an outer circumferential surface that slidably contacts an inner wall 221a of a housing chamber 221 in the protector 220, for example, as shown in FIG. 19. These resilient portions 215 are formed in a convex shape so as to protrude in a direction orthogonal to the parallel direction and directly contact the inner walls 221a. Including the resilient portions 215 in the support 213 in this way can effectively suppress rattling of the support 213 in the housing chamber 221 and allow the slider 210 to move smoothly within the protector 220. The above configuration makes it possible to surely move the slider 210 in synchronization with slide movement of the sliding door 3 and guide the wire harness 6.

The protector 220 includes a separator 222 arranged to partition a housing chamber 229 from a second housing chamber or housing chamber 221, an opening 223, and an actuator means, or an actuator unit, 225 arranged to actuate the slider 210, in a way similar to the exemplary embodiment described above. It does not include a rail 228, however.

In this exemplary embodiment, the housing chamber 229 houses the harness contact portion 212 of the slider 210 together with the middle portion of the wire harness 6, wherein the slider 210 is movable in the parallel direction. The housing chamber 221 houses the support 213 of the slider 210, which is slidably movable along the parallel direction. The separator 222, as shown, for example, in FIG. 19, may include a partition such as a projection formed protruding in a direction of extension along the longitudinal direction of the protector 220 and connection of a cabinet body 220a with a cabinet cover 220b (hereinafter referred to as "horizontal direction").

The actuator unit 225 includes a bobbin 227 and a spiral spring 228. The actuator unit 225 actuates the slider 210 by a restorative force thereof, for example, by pulling the slider 210 toward the side to which the bent portion 11 protrudes. The bobbin 227 is attached to a support shaft 226 having an axis in the horizontal direction within the protector 220 and configured to be rotatable about the support shaft 226. The bobbin 227 is provided on a position at the rear within the protector 220 and in the vicinity of the housing chamber 221.

The spiral spring 228 has one end fixed to the bobbin 227 and the other end to the support 213 of the slider 210. The spiral spring 228 is molded to be transformable in accordance with slide movement of the slider 210 between a flat plate having a thickness in a direction intersecting both the parallel direction and the horizontal direction (hereinafter referred to as "vertical direction") and a spiral. In addition, it is actuated to wind around the bobbin 227.

In one exemplary embodiment, the spiral spring 228 may be processed by molding a metal matrix in the form of a flat belt. The spiral spring 228 may have the so-called constant load property that makes a load relative to the amount of movement of the slider 210 (that is, a tensile force acting on the bobbin 227) almost constant if the distance from the slider 210 to the bobbin 227 in the parallel direction exceeds a certain length. When the spiral spring 228 has the constant load property, the slider 210 can move within the protector 220 smoother than when it is actuated using a coil spring or the like. Therefore, it is possible to guide the wire harness 6 reliably in response to movement of the sliding door 3.

The power supply device 1 thus configured houses the middle portion of the wire harness 6 together with the slider 210 in the box-shaped protector 220 having the longitudinal direction of the box shaped protector 220 extended along the front-rear direction. It also realizes the structure that houses in the protector 220 the actuator unit 225, including the bobbin 227, and the spiral spring 228 which is used to actuate the slider 210. Therefore, the outside shape of the protector 220 can be smaller. In addition, the maximum dimension of the outside shape of the spiral spring 228 when the slider 210 proximately approaches the bobbin 227 (that is, the dimension of the spiral spring 228 in the longitudinal direction in the protector 220) can be made smaller than when a conventional coil spring or the like is used.

In accordance with the power supply device 1 thus configured, when the sliding door 3 is slid rearward to a full-open position relative to the body 2 in the front-rear direction as shown in FIGS. 7, 20 and 13, the wire harness 6 is held in the following state. The middle portion of the wire harness 6 in the housing chamber 229 bends while it contacts the harness contact portion 212 and the coupler 214 of the slider 210 and receives an almost constant tension from the spiral spring 228 of the actuator unit 225. The bent portion 211 prevents the middle portion of the wire harness 6 from folding smaller than the minimum radius of curvature. Therefore, extra stresses such as excessive tension and compression can not act on the middle portion of the wire harness 6.

When the sliding door 3 is slid forward to a midpoint between the full-open position and a full-closed position in the front-rear direction as shown in FIGS. 8, 21 and 14, the wire harness 6 is held in the following state. The middle portion of the wire harness 6 in the housing chamber 229 bends while it contacts the harness contact portion 212 and the coupler 214 of the slider 210 and receives an almost constant tension from the spiral spring 228 of the actuator unit 225, as described above. The bent portion 111 still regulates the folded shape as described above.

Finally, when the sliding door 3 is slid forward to the full-closed position in the front-rear direction as shown in FIGS. 9, 22 and 15, the wire harness 6 is held in the following state. The middle portion of the wire harness 6 in the housing chamber 229 still contacts the harness contact portion 212 and the coupler 214 of the slider 210 but does not contact the bent portion 211 and remains almost straight.

With such a series of moves of the sliding door 3, the resilient portions 215 allow the support 213 of the slider 210 to move without rattling within the housing chamber 221 of the protector 220. Herewith, the spiral spring 228 of the actuator unit 225 allows the slider 210 to move smoothly. It is also possible to realize slide movement in a state in which the separator 222 separates the housing chamber 221 from the housing space 229 spatially. Therefore, it is possible to move the slider 210 smoothly and surely. It is also possible to guide the wire harness 6 without preventing movement of the slider 210 even if foreign matters mix in.

In the power supply device 1 for realizing the electrical connection structure of the above exemplary embodiment, the plural convex resilient portions 215 formed on the support 213 of the slider 210 are structured such that both ends of a beam are fixed to the support 213 as shown in FIG. 17. Alternatively, the beam may be cantilevered such that one end of the beam is supported on the support 213. This structure may further improve the resilient effect of the resilient portion 215 and effectively suppress rattling of the support 213 within the housing chamber 221 so that the slider 210 moves smoothly.

Another exemplary embodiment of the present invention is described next with reference to the accompanying drawings.

Figure 23:
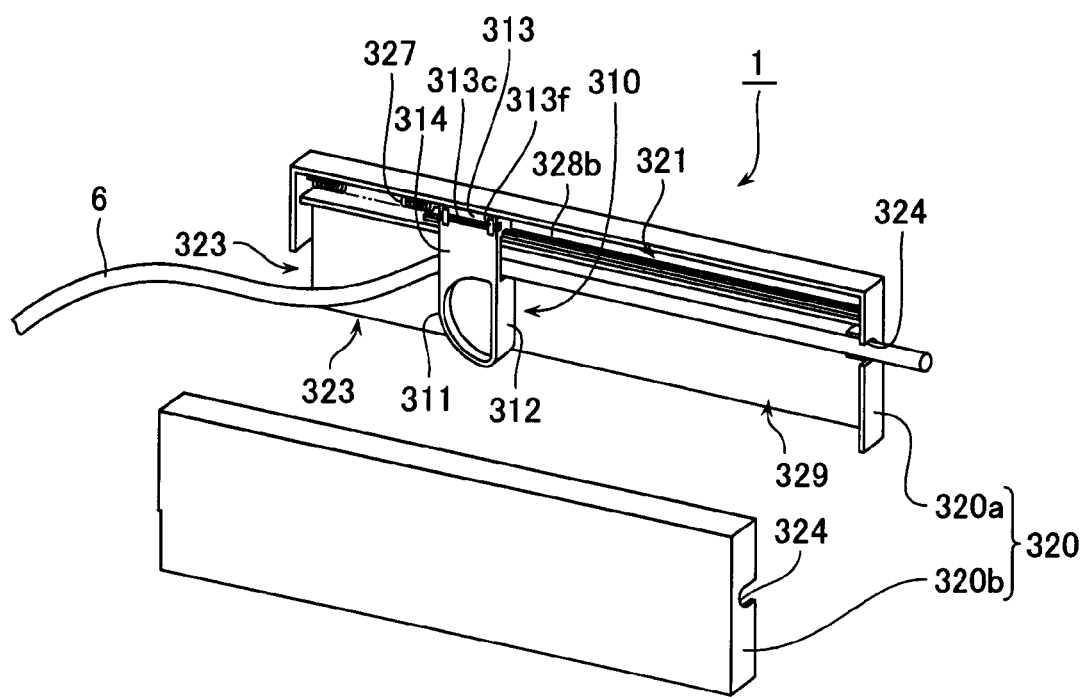
FIG. 23 is an exploded perspective view illustrative of a structure of a power supply device according to another exemplary embodiment of the present invention.
Figure 24:
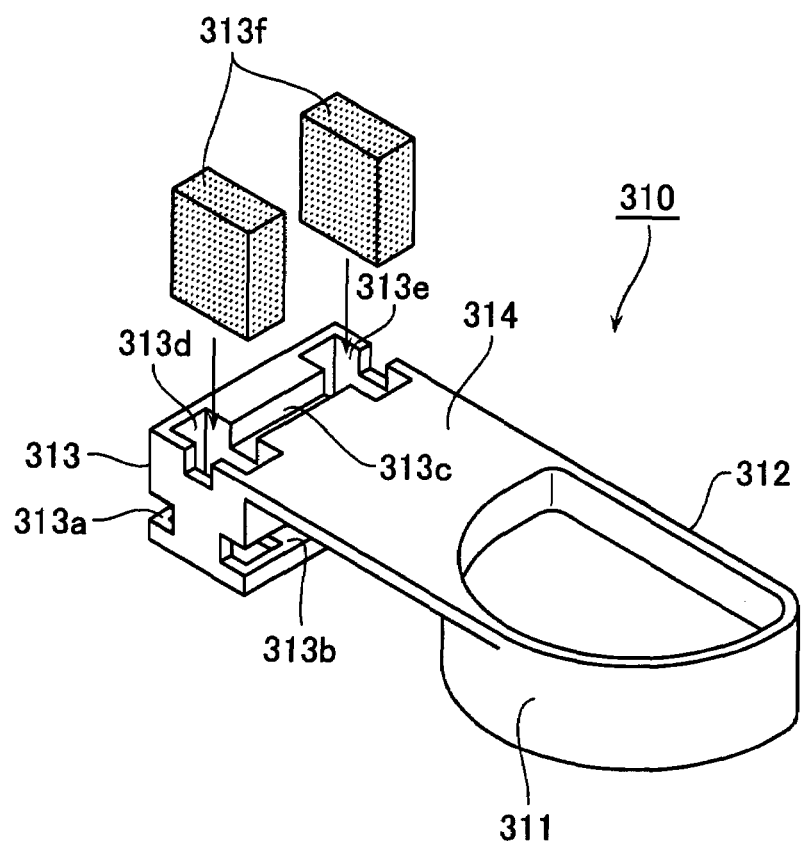
FIG. 24 is an external perspective view illustrating an example of a slider in the power supply device.
Figure 25:
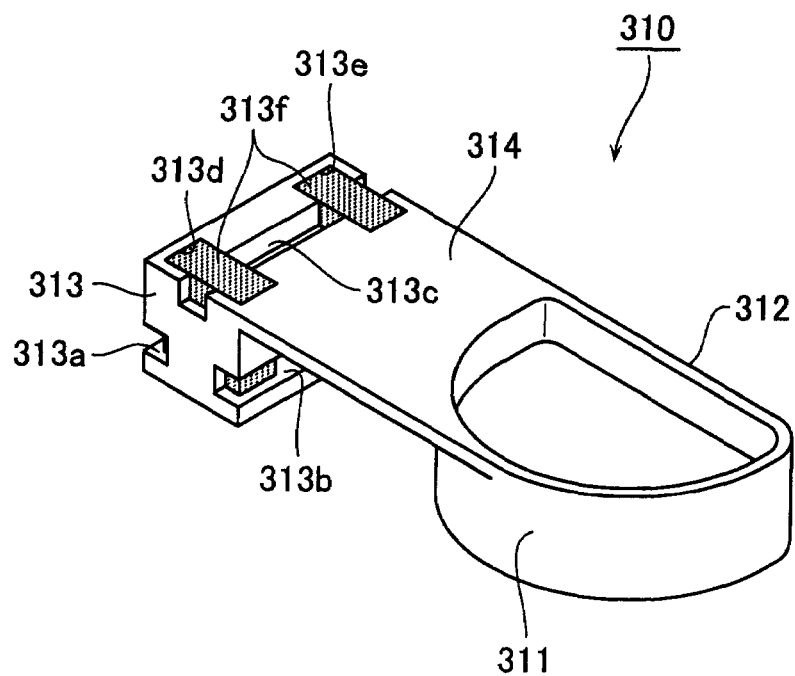
FIG. 25 is an external perspective view illustrative of the slider in the power supply device according to an exemplary embodiment of the present invention.
Figure 26:
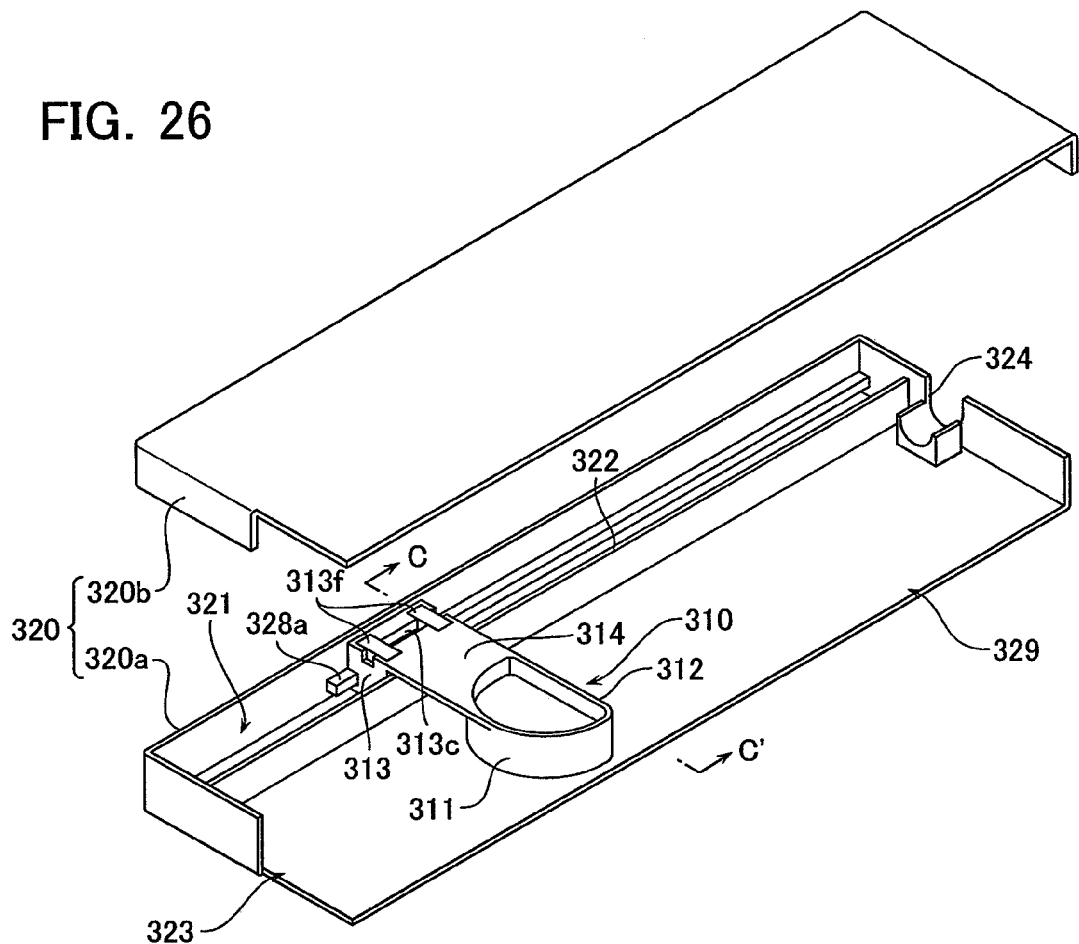
FIG. 26 is an exploded perspective view illustrative of an arrangement relation between the slider and a protector according to an exemplary embodiment of the present invention.
Figure 27:
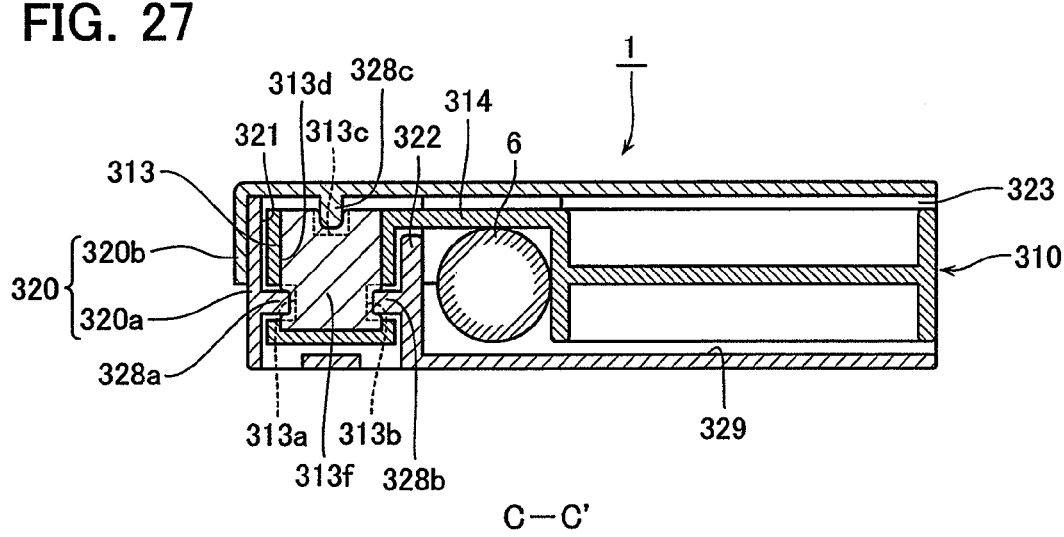
FIG. 27 is a cross-sectional view taken along C-C' in FIG. 26 after a wire harness is arranged in accordance with the power supply device.

FIG. 23 is an exploded perspective view illustrative of a structure of a power supply device according to an exemplary embodiment of the present invention. FIGS. 24 and 25 are external perspective views illustrating an example of a slider in the power supply device. FIG. 26 is an exploded perspective view illustrating an example of an arrangement relation between the slider and a protector. FIG. 27 is a cross-sectional view taken along C-C' in FIG. 26 after a wire harness is arranged in accordance with the power supply device.

Figure 28:
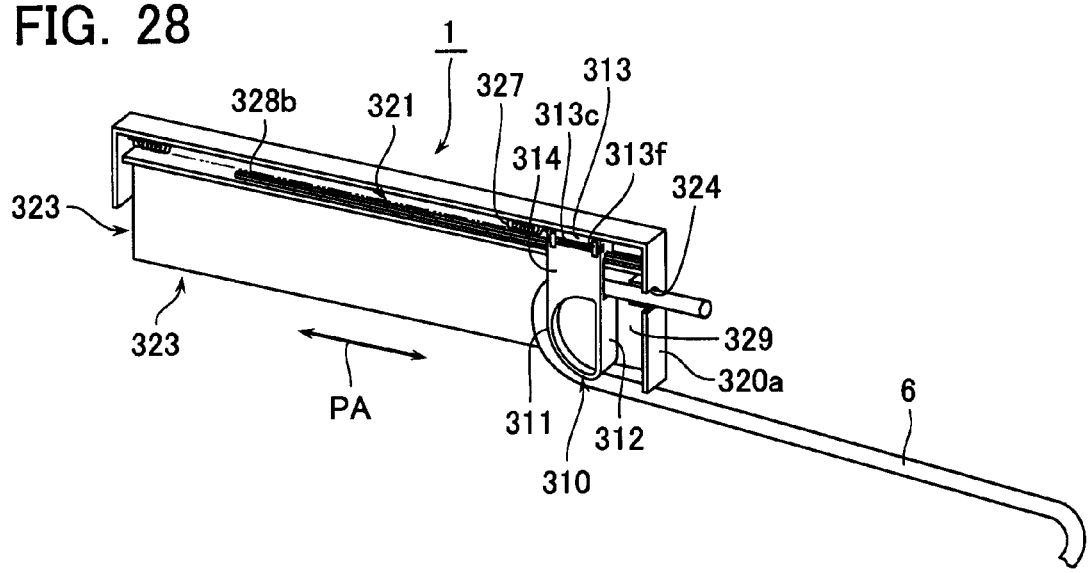
FIG. 28 is a perspective view illustrating an example of movement of various portions in the power supply device.
Figure 29:
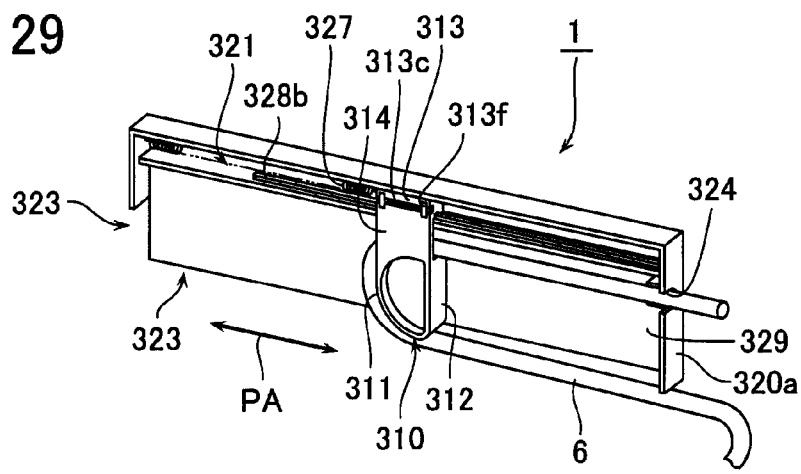
FIG. 29 is a perspective view illustrating another example of movement of various portions in the power supply device.
Figure 30:
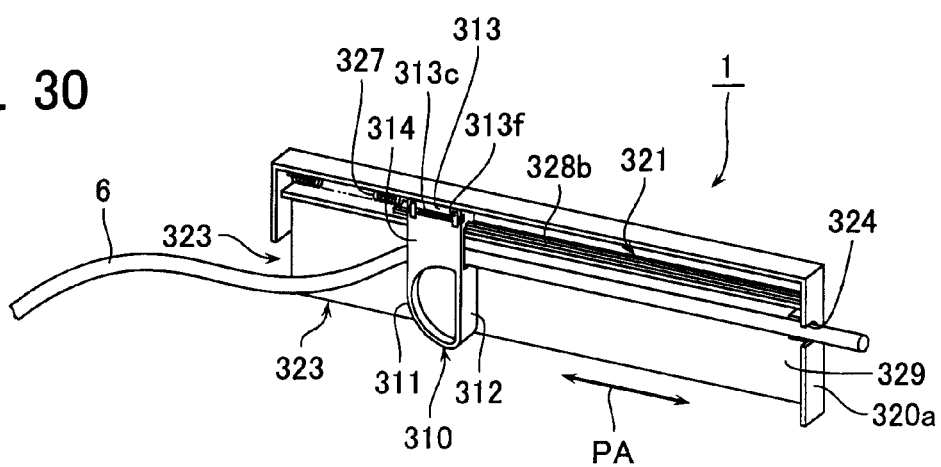
FIG. 30 is a perspective view illustrating another example of movement of various portions in the power supply device.

FIGS. 28-30 are prospective views illustrating examples of movements of a sliding door from a full-open position to a full-closed position with the electrical connection structure applied thereto, including illustrations of movements of various portions in the power supply device.

The power supply device 1 for realizing the electrical connection structure according to this exemplary embodiment is used to electrically connect the body 2 with the sliding door 3 in the automobile, similar to the exemplary embodiments described above. Also in this example, a power supply circuit and so forth in the power supply device 1 are omitted from the following description, and it is assumed that the sliding door 3 is attached to the body 2 on the left side. The power supply device 1 includes a wire harness 6, a slider 310, and a protector 320, like the exemplary embodiments described above.

The slider 310 includes a harness contact portion 312, a support 313 and a coupler 314, like the first embodiment. In this exemplary embodiment, the support 313 supports the harness contact portion 312 movable in the parallel direction relative to the protector 320. The support 313 includes concave trenches or recesses 313a, 313b and 313c having apertures on both horizontal ends orthogonal to the parallel direction and on the top end formed (extended) along the parallel direction. The support 313 also includes a pair of holes 313d and 313e formed in line along the front-rear direction and in communication with the recesses 313a, 313b and 313c from the outer circumferential surface. The paired holes 313d and 313e of the support 313 receive buffers 313f composed, for example, of felt material inserted therein to block parts of the recesses 313a, 313b and 313c, respectively. The paired recesses 313a, 313b and 313c of the support 313 engage later-described rails 328a, 328b and 328c while slidably contacting the buffers 313f. The coupler 314 is formed in a flat plate, different from other exemplary embodiments described above.

The protector 320 includes a separator 322, arranged to partition a housing chamber 329 from a housing chamber 321, an opening 323, rails 328a, 328b and 328c provided in the housing chamber 321 to engage the recesses 313a, 313b and 313c in the support 313 of the slider 310 while slidably contacting the respective buffers 313f, and an actuator means or a spring 327 arranged to actuate the slider 310, similar to the exemplary embodiments described above. In this exemplary embodiment, the rails 328a, 328b, 328c protrude toward inner walls of the housing chamber 321 that respectively oppose the recesses 313a, 313b and 313c in the support 313 of the slider 310, or both inner walls and an upper inner wall, and extend along the PA direction, as shown in FIG. 27. The rails 328a, 328b and 328c are fitted in the recesses 313a, 313b and 313c in the support 313 of the slider 310 such that the support 313 is engaged and housed slidably movable along the parallel direction.

The support 313 of the slider 310 is housed slidably movable, for example, in the housing chamber 321 of the protector 320. In this case, the paired recesses 313a and 313b engage the paired rails 328a and 328b via the buffers 313f. In addition, the other recess 313c engages the other rail 328c, for example, in a direction orthogonal to the direction of connection of the paired recesses 313a and 313b, similarly via a buffer 313f. This makes it possible to effectively suppress rattles of the support 313 within the housing chamber 321 movement of the slider 310 within the protector 320. Therefore, it is possible to surely move the slider 310 in synchronization with slide movement of the sliding door 3.

The protector 320 includes a cabinet body 320a with the housing chamber 321 formed therein, and a cabinet cover 320b detachably attached to the cabinet body 320a. In the cabinet body 320a, the paired rails 328a and 328b, which engage the paired recesses 313a and 313b in the support 313 of the slider 310 from the directions opposing thereto, are formed on the opposite inner walls of the housing chamber 321. In the cabinet cover 320b, the other rail 328c, which engages the other recess 313c in the support 313 of the slider 310 from the direction opposing thereto, is formed on the side that covers the housing chamber 321. This makes it possible to realize the structure that improves the accessibility on maintenance of the wire harness 6 and the slider 310 and surely houses the support 313 in the housing chamber 321.

In one exemplary embodiment, the rail 328a of the paired rails 328a and 328b in the housing chamber 321 of the protector 320, for example, is not formed along the entire portion of the rear inner wall of the housing chamber 321 as shown in FIG. 26. This portion may be used to remove the support 313 of the slider 310 from the cabinet body 320a and accordingly improve accessibility for of maintenance.

The middle portion of the wire harness 6 housed in the protector 320 is spatially separated from the housing chamber 321 by the separator 322 of the housing chamber 321 and the coupler 314 of the slider 310. Therefore, even if foreign matters mix through the opening 323, they can be effectively prevented from further mixing into the housing chamber 321 and consequently from affecting slide movement of the support 313.

The protector 320 may further include a tensile spring 327 having one end fixed to an inner wall located at the rear in the housing chamber 321 and the other end fixed to an outer circumferential surface of the support 313 of the slider 310 located opposite the inner wall, for example, as shown in FIG. 23. This allows the slider 310 to move smoother during movement of the sliding door 3 from the full-open position to the full-closed position.

In accordance with the power supply device 1 thus configured, when the sliding door 3 is slid rearward to the full-open position in the PA direction as shown in FIGS. 7, 28 and 13, the middle portion of the wire harness 6 in the housing chamber 329 bends while it contacts the harness contact portion 312 and the coupler 314 of the slider 310 and receives the strongest tension from the tensile spring 327. In this case, however, the bent portion 311 prevents the middle portion from folding smaller than the minimum radius of curvature. Therefore, extra stresses such as excessive tension and compression can not act on the middle portion of the wire harness 6.

When the sliding door 3 is slid forward to some midpoint from the full-open position toward the full-closed position in the PA direction as shown in FIGS. 8, 29 and 14, the middle portion of the wire harness 6 in the housing space 329 bends while it contacts the harness contact portion 312 and the coupler 314 of the slider 310 and receives some tension from the tensile spring 327. The bent portion 311 still regulates the folded shape as described above.

Finally, when the sliding door 3 is slid forward to the full-closed position in the PA direction as shown in FIGS. 9, 30 and 15, the middle portion of the wire harness 6 in the housing space 229 still contacts the harness contact portion 312 and the coupler 314 of the slider 310 but does not contact the bent portion 311 and remains almost straight.

With such a series of moves of the sliding door 3, in the power supply device 1, the recesses 313a-313c, the rails 328a-328c and the buffers 313f allow the support 313 of the slider 310 to move without rattling within the housing chamber 321 of the protector 320. In addition, the separator 322 separates the housing chamber 321 from the housing chamber 329. Therefore, it is possible to move the slider 310 smoothly and not to prevent movement of the slider 310 even if foreign matters mix through the opening 323.

For the purpose of smooth movement of the support 313 and so forth, the power supply device 1 of the above exemplary embodiment is structured to include three recesses 313a-313c formed in the support 313 of the slider 310, and convex rails 328a-328c formed in the protector 320 to engage the recesses 313a-313c via respective buffers 313f. Alternatively, the structure may include two recesses and rails or four or more recesses and rails if it can achieve smooth movement of the support 313 and so forth. For example, smooth movement of the support 313 and so forth can be achieved through formation of only two recesses 313b and 313c and two rails 328b and 328c of three recesses 313a-313c and three rails 328a-328c without forming the recess 313a and the rail 328a.

Although the exemplary embodiment of the present invention have been described, it will be understood by those skilled in the art that the present invention should not be limited to the described exemplary embodiments, but various changes and modifications can be made within the spirit and the scope of the present invention. Accordingly, the scope of the present invention is not limited to the described range of the following claims.

What is claimed is:

1. An electrical connection structure which electrically connects a stationary member to a member slidably movable in relation to the stationary member, the structure comprising:
    a wire harness having one end fixed to the stationary member and another end fixed to the movable member, and a middle portion between the ends arranged to be bendable;
    a slider configured to guide the wire harness, the slider comprising:
        a harness contact portion arranged to contact the middle portion of the wire harness and move in synchronization with slide movement of the movable member relative to the stationary member in a direction parallel to the direction of slide movement, the harness contact portion having a bent portion, wherein the bent portion is bent at a radius of curvature larger than a smallest radius of curvature at which the wire harness is bendable, the bent portion formed protruding toward either one of opposite sides in the parallel direction,
        a support arranged to support the harness contact portion movable in the parallel direction, and
        a coupler arranged to couple the harness contact portion and the support; and
    a protector arranged on the movable member and shaped in the form of a box extending along the parallel direction, the protector comprising:
        a separator arranged to separate a first housing chamber from a second housing chamber, the first housing chamber formed to house the harness contact portion of the slider together with the middle portion of the wire harness, the second housing chamber formed to house the support of the slider slidable along the parallel direction,
        an opening formed on a side of the separator opposite the side on which the second housing chamber is formed, so as to lead the wire harness out of the first housing chamber, and
        an actuator arranged to actuate the slider by a restorative force thereof to pull the slider toward the side to which the bent portion protrudes.

2. The electrical connection structure according to claim 1, wherein the support comprises at least one concave trench extending in the parallel direction,
    wherein the slider further comprises at least one buffer provided at least partly in the direction of the concave trench extending in the support,
    wherein the protector further comprises at least one rail provided in the second housing chamber over the entire movement range of the slider, extending in the parallel direction, having a tip pressed against the buffer and interposed in the concave trench to regulate movement of the slider.

3. The electrical connection structure according to claim 2, wherein the concave trenches are formed respectively on both sides of the support,
    wherein the rail is formed in a C-shape having an upper aperture in cross section and configured such that a pair of tips that form the C-shape are pressed against the buffers and interposed in the concave trenches to regulate the movement of the slider.

4. The electrical connection structure according to claim 3, wherein the buffers are further provided respectively in the concave trenches.

5. The electrical connection structure according to claim 2, wherein the concave trenches are formed respectively on both sides of the support,
    wherein the rails are formed respectively on both the opposite inner walls of the second housing chamber in the protector opposite said concave trenches.

6. The electrical connection structure according to claim 5, wherein the concave trench is further formed on at least one of the top surface and the bottom surface of the support,
    wherein the rail is further formed on an inner wall of the second housing chamber in the protector opposite the concave trench.

7. The electrical connection structure according to claim 5, wherein the buffers are further provided respectively in the concave trenches.

8. The electrical connection structure according to claim 2, wherein the buffer in the slider is composed of felt material.

9. The electrical connection structure according to claim 1, wherein the coupler has a crank-like bent shape in cross section.

10. The electrical connection structure according to claim 1, wherein the actuator includes a tensile spring having one end fixed to an inner wall of the second housing chamber of the protector present in the direction of slide movement and another end fixed to an outer circumferential surface of the support of the slider arranged opposite the inner wall.

11. The electrical connection structure according to claim 1, wherein the actuator includes a bobbin rotatably supported about an axis within the protector, and a resilient member having one end fixed to the bobbin and another end fixed to the support of the slider, the resilient member molded to be transformable between a flat plate and a spiral in accordance with slide movement of the slider and actuated to wind around the bobbin.

12. The electrical connection structure according to claim 11, wherein the resilient member in the actuator includes a spiral spring of metal having a load property that achieves an almost constant load relative to an amount of movement of the slider if a distance from the slider to the bobbin exceeds a certain length.

13. The electrical connection structure according to claim 11, wherein the support of the slider comprises, a plurality of convex resilient portions located on the outer circumferential surface that slidably contacts an inner wall of the second housing chamber, and arranged to directly contact the inner wall.

14. The electrical connection structure according to claim 13, wherein the resilient portions on the support of the slider are cantilevered.

15. The electrical connection structure according to claim 1, wherein the protector includes a cabinet body with the second housing chamber formed therein, and a cabinet cover with the separator formed therein and detachably attached to the cabinet body.

16. The electrical connection structure according to claim 1, wherein the wire harness is structured to contain a plurality of electric wires bundled and covered in a protective member.

17. The electrical connection structure according to claim 16, wherein the protective member is composed of Colgate material.

18. The electrical connection structure according to claim 1, wherein the stationary member is a body of an automobile, and the movable member is a sliding door attached to the body of the automobile.

19. An electrical connection structure comprising: a slider configured to guide a wire harness, wherein said slider comprises a harness contact portion, wherein the harness contact portion has a bent portion protruding toward either a left or right side of the slider in a sliding direction; and an actuator arranged to actuate the slider by a restorative force thereof to pull the slider toward a side to which the bent portion protrudes.

20. The electrical connection structure of claim 19, wherein the electrical connection structure electrically connects a stationary member to a member slidably movable in relation to the stationary member.

21. The electrical connection structure according to claim 19, wherein the bent portion is shaped at a radius of curvature larger than a smallest radius of curvature at which the wire harness is bendable.

22. The electrical connection structure according to claim 19, wherein the slider further comprises a support arranged to support the harness contact portion movable in the sliding direction.

23. The electrical connection structure according to claim 22, further comprising a protector, wherein the protector comprises:
  a separator arranged to separate a first housing chamber from a second housing chamber, the first housing chamber formed to house the harness contact portion of the slider together with the middle portion of the wire harness, the second housing chamber formed to house the support of the slider.

24. The electrical connection structure according to claim 23, wherein the protector includes a cabinet body with the second housing chamber formed therein, and a cabinet cover with the separator formed therein and detachably attached to the cabinet body.

25. The electrical connection structure according to claim 22, further comprising a coupler arranged to couple the harness portion and the support, wherein the coupler has a crank-like bent shape in cross section.

26. The electrical connection structure according to claim 19, wherein the actuator is a spring.

27. The electrical connection structure according to claim 19, wherein the bent portion is in the shape of a semi-circle.

28. The electrical connection structure according to claim 19, wherein the wire harness wraps around the outer diameter of the bent portion.

* * * * *